United States Patent
Wakumoto et al.

(10) Patent No.: US 8,670,332 B2
(45) Date of Patent: Mar. 11, 2014

(54) SYSTEMS AND METHODS FOR NOTIFYING USERS OF A NETWORK RESOURCE OUTAGE

(75) Inventors: Shaun Wakumoto, Roseville, CA (US);
Bud A. Rojas, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 487 days.

(21) Appl. No.: 12/267,514

(22) Filed: Nov. 7, 2008

(65) Prior Publication Data

US 2010/0118712 A1    May 13, 2010

(51) Int. Cl.
*G01R 31/08* (2006.01)

(52) U.S. Cl.
USPC ............................................. 370/242; 714/25

(58) Field of Classification Search
None
See application file for complete search history.

(56) References Cited

U.S. PATENT DOCUMENTS

| | | | |
|---|---|---|---|
| 6,581,166 B1 * | 6/2003 | Hirst et al. | 714/4 |
| 7,050,718 B2 * | 5/2006 | Rychlicki | 398/57 |
| 7,152,179 B1 * | 12/2006 | Critchfield | 714/4 |
| 7,209,968 B1 * | 4/2007 | Secer | 709/226 |
| 7,343,515 B1 * | 3/2008 | Gilbertson et al. | 714/10 |
| 7,480,840 B2 * | 1/2009 | Hathorn et al. | 714/724 |
| 7,570,579 B2 * | 8/2009 | Oran | 370/216 |
| 7,649,912 B2 * | 1/2010 | Balasubramanian et al. | 370/509 |
| 7,908,368 B2 * | 3/2011 | Strole | 709/224 |
| 2006/0200701 A1 * | 9/2006 | Callender | 714/38 |
| 2008/0222264 A1 * | 9/2008 | Bostick et al. | 709/206 |
| 2008/0276304 A1 * | 11/2008 | Maffione et al. | 726/4 |
| 2009/0217096 A1 * | 8/2009 | Ing et al. | 714/37 |
| 2009/0307522 A1 * | 12/2009 | Olson et al. | 714/4 |

* cited by examiner

*Primary Examiner* — Rhonda Murphy

(57) ABSTRACT

Systems and methods are disclosed for a network switch that periodically determines whether there are connectivity problems with first ports and a second port independently of responding to requests from computer systems. Information to be sent to the computer system that sends a request is generated. The information includes an error message regarding at least one of the connectivity problems when one of the first ports or the second port with the connectivity problem is required to respond to the request.

19 Claims, 2 Drawing Sheets

SYSTEMS AND METHODS FOR NOTIFYING USERS OF A NETWORK RESOURCE OUTAGE

BACKGROUND

As use of large information networks such as the Internet continues to grow, so does the networking of two or more computers to share access to the network. For instance, while computers for a business are often connected to share a local area network, wide area network, and/or Internet access, it is also becoming more common for home computer users to install a network to more easily share Internet access, printers, files, and other resources.

Occasionally, a resource such as the Internet will become inaccessible for some reason. A user trying to access the inoperable resource via a network often experiences a long time delay before an error message is displayed. The error messages typically do not provide much information regarding the problem, and the user may have to contact other users or administrators of the network to determine whether they are experiencing the same problem, and what the source of the problem may be.

SUMMARY

In some embodiments, a network switch periodically determines whether there are connectivity problems with first ports and a second port independently of responding to requests from computer systems. The switch generates Information to be sent to the computer system that sends a request. The information includes an error message regarding at least one of the connectivity problems when one of the first ports or the second port with the connectivity problem is required to respond to the request.

BRIEF DESCRIPTION OF THE DRAWINGS

Embodiments of the invention relating to both structure and method of operation may best be understood by referring to the following description and accompanying drawings.

DETAILED DESCRIPTION

Figure 1:
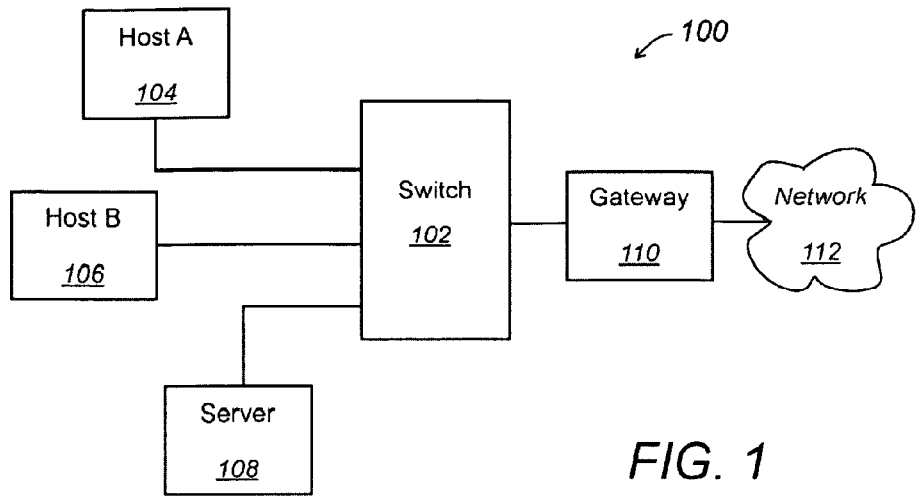
FIG. 1 is a block diagram of an embodiment of a system for notifying users of a network resource outage.

FIG. 1 is a schematic diagram depicting an embodiment of system 100 capable of notifying users of a network resource outage in accordance with embodiments of the invention. In the example shown, switch 102 is depicted as being connected to host A 104, host B 106, server 108, and gateway 110. It should be noted that any suitable number of hosts 104, 106, servers 108, and gateway computers 110 may be configured to communicate with switch 102. Hosts 104, 106, server 108 and gateways 110 may also be referred to collectively as "computer systems" herein unless otherwise noted. Additionally, the term "switch" is used to refer to networking devices such as switches and routers that are capable of receiving and transmitting requests and responses between hosts 104, 106, servers 108, and gateway 110.

Switch 102 is configured to inform users of network connectivity issues when the issues prevent users of hosts 104, 106, server 108 and gateways 110 from being able to reliably communicate with network 112 via switch 102 and gateway 110. Rather than leaving users wondering why they are not able to reach a given network resource, switch 102 intercepts requests from the users' computer systems and sends a message to the requesting user's computer system to inform them of the issue.

Hosts 104, 106, servers 108, and gateways 110 may be configured to communicate with switch 102 via suitable communication links such as any one or combination of T1, ISDN, or cable line, a wireless connection through a cellular or satellite network, or a local data transport system such as Ethernet or token ring over a local area network. Various input/output devices, such as keyboard and mouse (not shown), can be included to allow a user to interact with components internal and external to hosts 104, 106, servers 108, gateways 110, and switch 102. Additionally, hosts 104, 106, servers 108, and gateways 110 can be embodied in any suitable computing device, and so include personal data assistants (PDAs), telephones with display areas and keyboards, network appliances, desktops, laptops, digital imaging devices, and other suitable computing devices. Logic instructions executed by hosts 104, 106, servers 108, gateways 110, and switch 102 can be implemented using any suitable combination of hardware, software, and/or firmware, such as microprocessors, Field Programmable Gate Arrays (FPGAs), Application Specific Integrated Circuit (ASICs), or other suitable devices.

Figure 2:
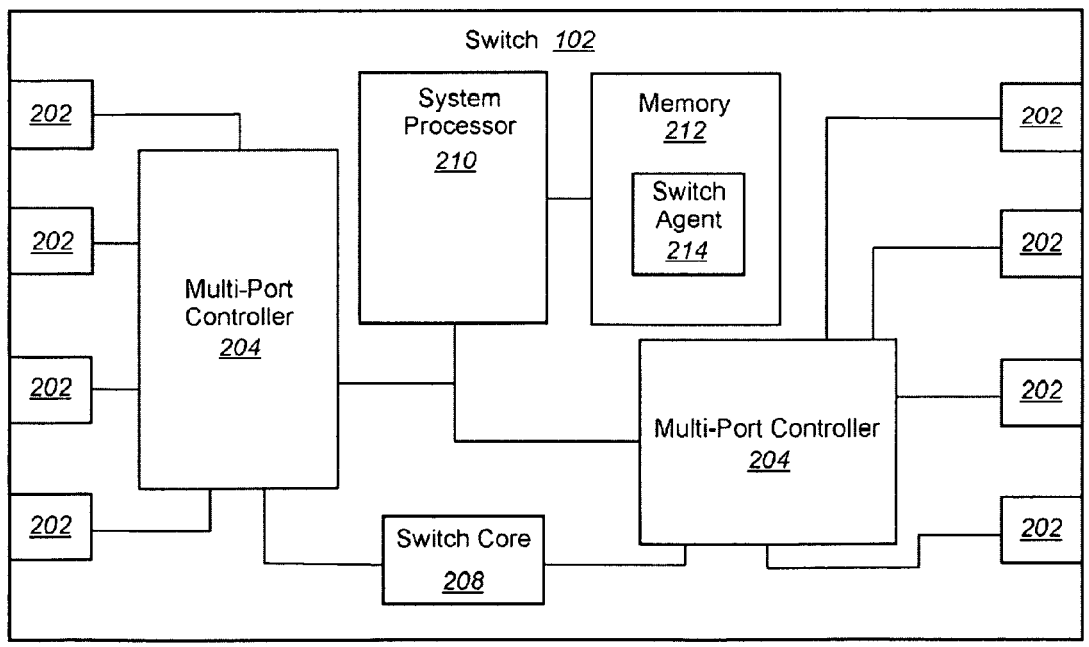
FIG. 2 shows a block diagram of an embodiment of a switch that can be used in the system of FIG. 1.

Referring to FIGS. 1 and 2, FIG. 2 is a schematic diagram of a switch 102 configured to notify users of a network outage in accordance with an embodiment of the invention. The switch 102 may be configured with multiple ports 202. The ports 202 may be controlled by one or more controllers 204. Hosts 104, 106, servers 108, and gateways 110 are configured to communicate with ports 202 and are thus able to share and access remote resources with one another via switch 102. For example, host A 104 may have access to a color laser printer that is physically connected to host B 106 via switch 102. Additionally, hosts 104, 106 may have access to information and other resources stored on or connected to server 108 via switch 102. Further, hosts 104, 106, and server 108 may access resources available from an information network such as the Internet via switch 102 and gateway 110.

The switch 102 may transfer (i.e. "switch") packets between ports 202 by way of switch core 208 that interconnects the ports 202 through controllers 204. A system processor 210 and memory 212 may be used to further control the switch 102. For example, a switch agent 214 may be implemented as code in memory 212 that is executed by the system processor 210 of the switch 102.

The various functions, processes, methods, and operations performed or executed by system 100 can be implemented as programs that are executable on various types of processing units such as controllers, central processing units, microprocessors, digital signal processors, state machines, programmable logic arrays, and the like. The programs such as switch agent 214 can be stored on any computer-readable medium or memory device 212 for use by or in connection with any computer-related system or method. A computer-readable medium is an electronic, magnetic, optical, or other physical memory device 212 or means that can contain or store a computer program such as switch agent 214 for use by or in connection with system 100, method 300 (FIG. 3), process, or procedure. Programs can be embodied in logic instructions that are executed by a computer-readable medium for use by or in connection with an instruction execution system, device, component, element, or apparatus, such as a system based on a computer or processor, or other system that can fetch instructions from an instruction memory or storage of any appropriate type.

Network switch 102 includes a plurality of first ports 202 configured to communicate with a corresponding plurality of computer systems 104, 106, 108. The switch 102 further includes other ports 202 configured to communicate with an information network (not shown), a computer processor 210, and logic instructions, such as switch agent 214, on computer readable storage media executable to cause the computer processor to periodically determine whether there are connectivity problems with the first ports 202 and the second port 202 independently of responding to requests from the computer systems 104, 106, 108. The logic instructions generate information to be sent to the computer system 104, 106, 108 that sends a request. The information can include an error message regarding at least one of the connectivity problems when one of the first ports 202 or the second port 202 with the connectivity problem is required to respond to the request.

The logic instructions can further cause the computer processor to clear the error message when the one of the connectivity problems is no longer detected, generate a request for status to determine whether there are connectivity problems with the first ports and the second port, and periodically determine whether there are connectivity problems based on events detected by the switch. The events can include network loops, route flapping, Spanning Tree Protocol (STP) state changes, uplink failure, inability to contact default gateway, and/or spoofed Media Access Control (MAC), among others.

The logic instructions can further cause the computer processor to provide the error message to other computer systems in response to requests from the other computer systems that require the one of the first ports or the second port with the one of the connectivity problems.

The logic instructions can also cause the computer processor to intercept the request using internal functionality such as an Access Control List (ACL) to detect requests using a specified communication protocol, and transmit a response including the error message to the computer system that sent the request.

Figure 3:
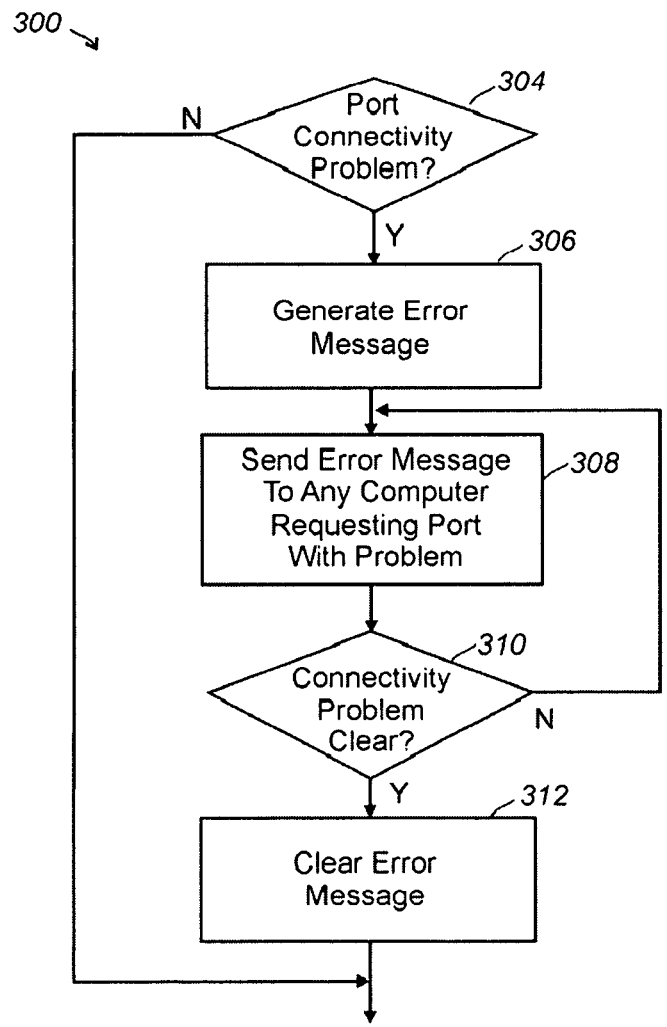
FIG. 3 is a flow chart illustrating an embodiment of an automated method that can be implemented in the switch of FIG. 2.

FIG. 3 is a flow chart depicting a method 300 for notifying users of a network resource outage that may be implemented in agent 214 (FIG. 2) or other suitable component of switch 102. Process 304 periodically checks whether there are any connectivity problems with or events on the ports in the switch such as layer 2 network loops, Internet Protocol (IP) route flapping, Spanning Tree Protocol (STP) changes, uplink failure, inability to contact the default gateway, and spoofed (falsified) Media Access Control (MAC) address, among others. The ports can be configured to communicate with a plurality of computer systems and a gateway computer or router that provides access to the rest of the network. The connectivity status can be checked periodically whether or not a request requiring use of the ports has been received in the switch. In some embodiments, a request for status of ports can be generated by the switch to determine whether there are connectivity problems with the ports. Examples of events that can be included are network loops, route flapping, Spanning Tree Protocol (STP) state changes, uplink failure, inability to contact default gateway, and/or spoofed Media Access Control (MAC), among others.

If a connectivity problem is detected, process 306 generates an error message that typically describes the problem and/or other suitable information. For example, the message can also provide instructions for correcting the problem and/ or the length of time the problem is expected to last, if this information is known or provided to the switch. The switch can be configured with troubleshooting information for each type of problem, and this information can be included in the message. In other implementations, an application program interface or other suitable facility can be provided in the switch to allow an administrator to provide information to be included in the message once the administrator becomes aware of the problem. Note that process 306 can generate different error messages for as many different types of connectivity problems detected on one or more of the ports.

Process 308 sends the error message(s) generated in process 306 to any computer requesting a port with one or more connectivity problems. The switch can be configured to intercept requests from computers when the requests are to be sent via ports with connectivity problems. For example, the switch can intercept the requests using an Access Control List (ACL) to detect requests using a specified communication protocol. Instead of forwarding the request, the switch intercepts the request and returns a response that includes the error message generated in process 306 to the computer that issued the request.

Process 308 continues issuing the error message to requests on ports with connectivity problems until process 310 determines that the connectivity problem(s) have been cleared for the port(s). Once a connectivity problem is cleared, the error message for the port can also be cleared. Process 300 continues running whenever the switch is operational.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

The illustrative block diagrams and flow charts provided herein depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, a few specific examples of dialogs and data models are described. The illustrative system for declarative association of dialog fields can be used with any suitable dialogs or data models. The illustrative techniques may be used with any suitable data processing configuration and with any suitable servers, computers, and devices.

What is claimed is:

1. A network switch comprising:
a plurality of first ports to communicate with a corresponding plurality of computer systems;
a second port to communicate with an information network;
a computer processor;
logic instructions on non-transitory computer readable storage media executable to cause the computer processor to:
periodically determine whether there is a connectivity problem with at least one of the first ports and the second port independently of responding to requests from the computer systems;
if one of the first ports and the second port is determined to have a connectivity problem, generate information including an error message;
receive, from one of the computer systems, a request directed to the port having the connectivity problem;
in response to receipt of the request directed to the port having the connectivity problem, intercept the request using an access control list (ACL) to detect requests using a specified communication protocol and transmit the error message to the computer system from which the request is received; and
clear the error message when the connectivity problem is no longer detected.

2. The switch according to claim 1 further comprising:
logic instructions executable by the computer processor to cause the computer processor to:
generate a request for status to determine whether there is a connectivity problem with at least one of the first ports and the second port.

3. The switch according to claim 1 further comprising:
logic instructions executable by the computer processor to cause the computer processor to:
periodically determine whether there is a connectivity problem based on events detected by the switch.

4. The switch according to claim 3 further comprising:
the events including at least one of the group consisting of: network loops, route flapping, Spanning Tree Protocol (STP) state changes, uplink failure, inability to contact default gateway, and spoofed Media Access Control (MAC).

5. The switch according to claim 1 further comprising:
logic instructions executable by the computer processor to cause the computer processor to:
provide the error message to other computer systems in response to requests from the other computer systems that require the one of the first ports or the second port with the connectivity problem.

6. The switch according to claim 1, wherein the information including the error message further includes troubleshooting information including instructions to correct the connectivity problem and a length of time the connectivity problem is expected to last.

7. The switch according to claim 6 further comprising:
logic instructions executable by the computer processor to cause the computer processor to:
provide an application program interface to allow an administrator to provide information to be included in the error message once the administrator becomes aware of the connectivity problem.

8. A computer-implemented method comprising:
checking connectivity status of ports in a network switch, wherein the ports are to communicate with a plurality of computer systems and a gateway computer that provides access to an information network, the connectivity status being checked at predetermined times whether or not a request requiring use of the ports has been received in the switch;
if one of the ports is determined to have a connectivity problem, generating information including an error message;
receiving, from one of the plurality of computer systems, a request directed to the port having the connectivity problem;
in response to receipt of the request directed to the port having the connectivity problem, intercepting the request using an access control list (ACL) to detect requests from the plurality of computer systems and transmitting the error message to the computer system from which the request is received; and
clearing the error message when the connectivity problem is no longer detected.

9. The method according to claim 8, wherein:
generating the information includes generating troubleshooting information providing instructions to correct the connectivity problem and a length of time the connectivity problem is expected to last.

10. The method according to claim 9 further comprising:
providing an application program interface to allow an administrator to provide information to be included in the error message once the administrator becomes aware of the at least one connectivity problem.

11. The method according to claim 8 further comprising:
generating a request for status of ports on the switch to determine whether there is at least one connectivity problem with the ports.

12. The method according to claim 8 further comprising:
determining whether there is at least one connectivity problem with the ports based on events detected by the switch.

13. The method according to claim 12 further comprising:
the events including at least one of the group consisting of: network loops, route flapping, Spanning Tree Protocol (STP) state changes, uplink failure, inability to contact default gateway, and spoofed Media Access Control (MAC).

14. The method according to claim 8 further comprising:
providing the error message to other computer systems in response to requests from the other computer systems that require one of the ports with the at least one connectivity problem.

15. An apparatus comprising:
a processor; and
a memory containing computer-readable instructions to be executed by the processor, the computer-readable instructions comprising code to:

check connectivity status of ports in a network switch, wherein the ports are to communicate with a plurality of computer systems and a gateway computer that provides access to an information network, the connectivity status being checked at predetermined times whether or not a request requiring use of the ports has been received in the network switch;

generate an error message when the connectivity status indicates a connectivity problem with one of the ports;

receive from a computer system a request directed to the port with the connectivity problem;

in response to receipt of the request directed to the port with the connectivity problem, intercept the request using an access control list (ACL) to detect requests using a specified communication protocol and provide the error message to the computer system from which the request is received; and clear the error message when the connectivity problem is no longer detected.

16. The apparatus according to claim 15, wherein the error message further includes troubleshooting information including instructions to correct the connectivity problem and a length of time the connectivity problem is expected to last.

17. The apparatus according to claim 15, the computer-readable instructions further comprising code to:

determine whether there is a connectivity problem with the ports based on events detected by the switch.

18. The apparatus according to claim 17, wherein the events detected by the switch include at least one of the group consisting of: network loops, route flapping, Spanning Tree Protocol (STP) state changes, uplink failure, inability to contact default gateway, and spoofed Media Access Control (MAC).

19. The apparatus according to claim 15, the computer-readable instructions further comprising code to:

provide an application program interface to allow an administrator to provide information to be included in the error message once the administrator becomes aware of the connectivity problem.

* * * * *